Aug. 12, 1924.
W. BAUERSFELD
1,504,314
EXPOSURE CINEMATOGRAPH
Filed Dec. 22, 1922
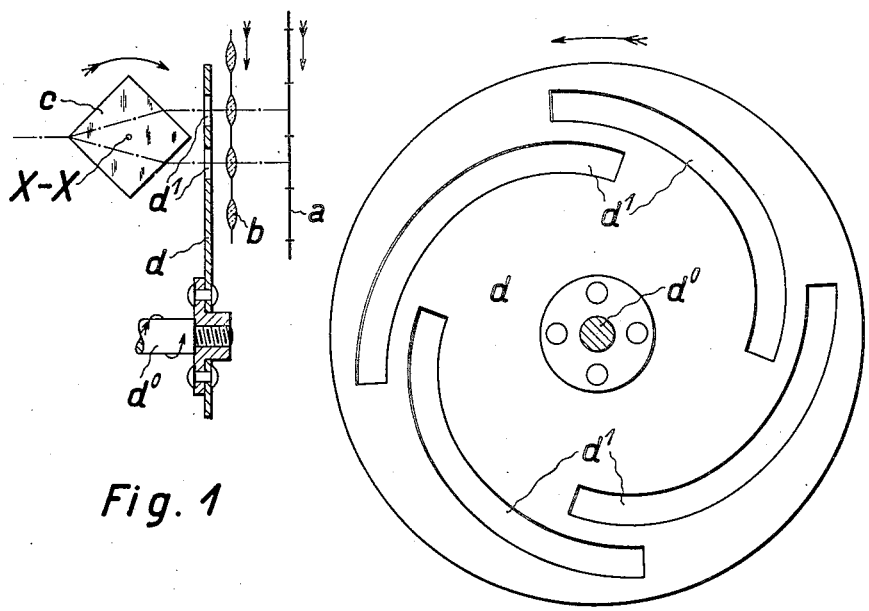
Fig. 1
Fig. 2
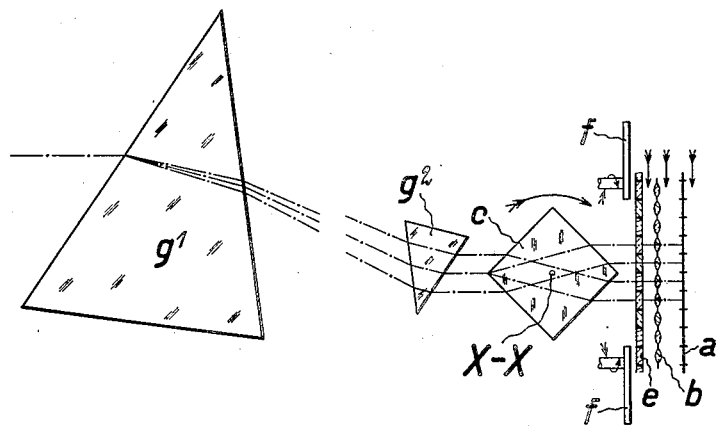
Fig. 3
Inventor:
Walther Bauersfeld.

Patented Aug. 12, 1924.

1,504,314

UNITED STATES PATENT OFFICE.

WALTHER BAUERSFELD, OF JENA, GERMANY, ASSIGNOR TO THE FIRM OF CARL ZEISS, OF JENA, GERMANY.

EXPOSURE CINEMATOGRAPH.

Application filed December 22, 1922. Serial No. 608,556.

*To all whom it may concern:*

Be it known that I, WALTHER BAUERSFELD, a citizen of Germany, and residing at Jena, Germany, have invented a new and useful Exposure Cinematograph (for which I have filed an application in Germany December 15, 1921), of which the following is a specification.

The present invention relates to an exposure cinematograph having a uniformly traversed film and a device, containing several movable objectives, for compensating the film motion. As the entrance pupil of an optical apparatus is that opening in which the ray pencils, forming an image, intersect and is formed either by the objective itself or by the image, formed by the objective, of a diaphragm lying behind the objective, the advantages of these compensating devices are faced by the drawback that during the exposure owing to the motions of the objectives the entrance pupils of the apparatus are also moving. With the cinematographic projection of the respective film this drawback results in objectionable images.

According to the invention in compensating devices in which the motion of the objectives is approximately rectilinear and parallel to the direction of motion of the film, this drawback can be obviated by inserting, in front of the compensating device, into the path of rays of the exposure cinematograph an optical system which serves for almost stopping the motion of the entrance pupils. A simplified optical system, attaining this object, is, for instance, a prismatic glass body which is disposed rotatably about an axis perpendicular to its principal section in such a way that its principal section is both parallel with the axes of the objectives and the film motion.

In order that the film will only be struck by such luminous rays emanating from one and the same entrance pupil, it is advisable to introduce a movable diaphragm-device into the path of rays between the optical system and the film.

Fig. 1 shows in a section through the principal axis an apparatus for making cinematographic exposures in one colour according to the invention, Fig. 2 is a diaphragm comprised in this apparatus in a plan view, whilst Fig. 3 shows an apparatus for making cinematographic exposures in three colours. The directions of motion of the movable parts are shown by arrows.

In Figs. 1 and 2 there moves in front of a continuously moved film $a$ an endless chain of objectives $b$ at a speed equal to that of the film. In front of the chain of objectives there is disposed a prismatic glass body $c$, having a square principal section, rotatable about an axis X—X perpendicular to its principal section and passing through the middle of the principal section, in such a manner that its principal section is parallel to both the axes of the objectives $b$ and the film motion. The lateral length of the square is so chosen that in the position of the glass body, shown in the drawing, the axial ray is divided into two rays, the distance apart of which is equal to the film division. The glass body $c$ is assumed to be so coupled to the film-actuating mechanism as to undergo a complete revolution when the film $a$ is advancing by the height of four film pictures. In the same way as such a prism, on being inserted in the well-known manner between a uniformly traversed film and a fixed objective, optically stops the film motion, in the present case the prism also causes the objective $b$, which is effective at any one time, to stop when viewed from the object to be exposed; the motion of the entrance pupil which in itself would follow the motion of this objective, is thus stopped. Between the glass body $c$ and the chain of objectives is disposed a disc $d$ having four light-openings $d^1$, which disc brings about that light is always effective, which is only transmitted to one of the objectives $b$, and thus only emanates from one entrance pupil, with the exception of a short transition period which lies in front and behind the position shown in the drawing and within which period light is imparted to two objectives. The disc $d$ is fixed on a shaft $d^o$ having the same number of revolutions as the glass body $c$.

In the example shown in Fig. 3 there moves again in front of a continuously moved film $a$ an endless chain of objectives $b$ at a speed equal to that of the film. Directly in front of the chain of objectives moves an endless chain of colour filters $e$ at again the same speed. In front of the colour filters there is disposed rotatably about an axis X—X in the same way as in the first example a prismatic glass body $c$ having a square principal section. The lateral length of the square is so chosen that in the position of the glass body $c$, shown in the drawing, the axial ray is divided into two rays, the distance apart of which is equal to the triple film division. The glass body $c$ is assumed to be coupled to the film-actuating mechanism in such a manner as to experience a complete revolution when the film $a$ advances by the height of twelve film pictures. Between the glass body $c$ and the colour filters $e$ are two circular tin discs $f$, each of which is rotatable about an eccentric axis parallel to the axes of the objectives $b$. The discs $f$ are assumed to be so coupled to the film-actuating mechanism that each disc experiences a complete revolution when the film advances by the height of three film pictures. In addition, the arrangement is such that in the position of the glass body $c$, shown in the drawing, six film pictures, and in that position of the glass body, in which the unbroken axial ray passes through the glass body, three film pictures are exposed to the light. In front of the glass body $c$ there are rigidly inserted into the path of rays two colour-dispersing prisms $g^1$ and $g^2$ by means of which a ray of white light striking the prism $g^1$ and being parallel to the axes of the objectives $b$ is so dissolved into coloured rays that the totality of the coloured rays leaving the rear prism $g^2$ is parallel to the axes of the objectives. As may be seen, in this example three entrance pupils corresponding to the colour ranges chosen are brought to a standstill by the glass body $c$, to which pupils, reckoned from the object to be taken, there corresponds in front of the prism $g^1$ a single entrance pupil.

I claim:

In an exposure cinematograph a uniformly traversed film, a device adapted to compensate the film motion and containing several objectives lying in the path of rays, which are movable approximately rectilinear and parallel to the direction of motion of the film, and an optical system movably disposed in front of the said compensating device and adapted to deflect the rays traversing it in such a manner that the axis of each of the said objectives during its presence in the field of rays coincides with one and the same ray.

WALTHER BAUERSFELD.